June 23, 1953   J. W. MANN ET AL   2,642,627
METHOD OF HEATING THE INTERIOR OF PLASTIC PREFORMS
Filed Oct. 27, 1950   2 Sheets-Sheet 1
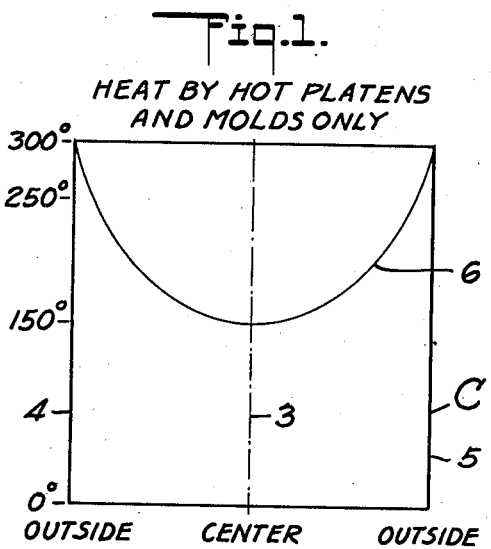
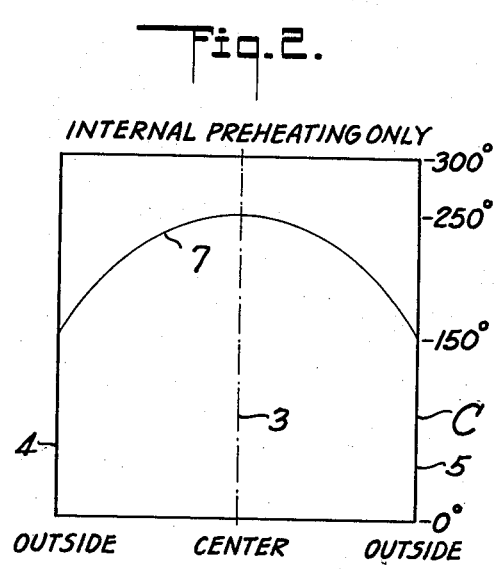
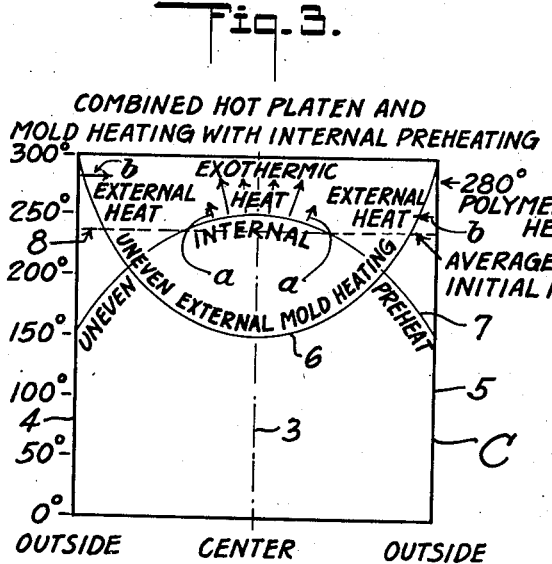
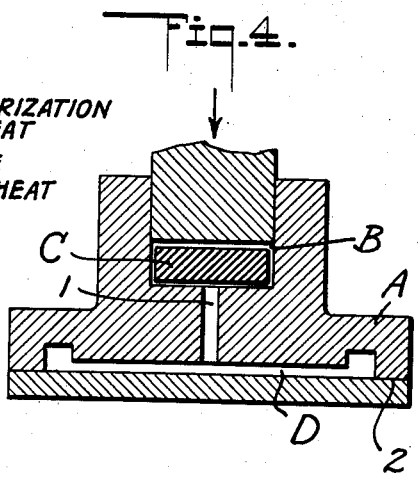
INVENTOR.
JULIUS W. MANN
BY GEORGE F. RUSSELL
Munn, Liddy & Glaccum
ATTORNEYS June 23, 1953  J. W. MANN ET AL  2,642,627
METHOD OF HEATING THE INTERIOR OF PLASTIC PREFORMS
Filed Oct. 27, 1950  2 Sheets-Sheet 2

*INVENTORS*
JULIUS W. MANN
GEORGE F. RUSSELL
BY

*Munn, Liddy & Glaccum*
ATTORNEYS

Patented June 23, 1953

2,642,627

UNITED STATES PATENT OFFICE 2,642,627

METHOD OF HEATING THE INTERIOR OF PLASTIC PREFORMS

Julius W. Mann and George F. Russell, Tacoma, Wash.

Application October 27, 1950, Serial No. 192,416

1 Claim. (Cl. 18—48)

The present invention relates to methods of preheating plastic preforms and consists of combinations, constructions and arrangements hereinafter described and claimed, and in the steps hereinafter set forth. This application is a continuation of our case filed June 6, 1946, Serial No. 674,803, now abandoned.

In the molding of plastic articles, particularly in compression, transfer or injection molding, it is common to place a preform in a heated cylinder which has a passage leading to a heated mold in the case of transfer molding; or to place a preform in the heated mold itself in compression molding. In transfer molding, a heated piston is forced by hydraulic means into the cylinder and the pressure of the piston on the preform and the heated cylinder and piston creates a temperature in the preform approximating its own, roughly 300° F. This heat which is conducted through the preform in time, along with the pressure applied to the piston, causes the resin to liquefy and flow into the mold.

In compression molding, direct contact of the heated mold itself with the outer surfaces of the preform transfers the mold temperature to the preform and in conjunction with the pressure applied to the mold sections, causes the liquification of the preform and the flow of the resin to all parts of the mold. In current practice it has been found that during the first instants of compression only the outer surface of the preform is raised to a temperature approximating that of the mold itself, while the interior remains considerably cooler. Time corrects this situation by conduction so that the heat eventually is conducted to the center portions of the preform. During the first instants of compression, the cooler center portion of the preform does not receive a sufficient quantity of heat by conduction to make it liquify and flow as readily as the outer sections of the preform which are in contact with the hot mold surfaces. When compression takes place, as in transfer molding, this cooler center portion tends to clog the passage leading from the cylinder to the mold until the entire mass is heated throughout by conduction. Naturally, therefore, resin flow is non-uniform, the first flow taking place from around the outside or hotter edges of the preform and the later flow being the center portion as it absorbs heat. The result is slow closing time and uneven resin flow.

It will be noted that there are several different approaches to the technique of molding by compression, transfer, or injection as well as other methods. In general, however, the above procedure is common to most types of molding wherein a preform is utilized. To a lesser degree the same situation applied when powder, instead of a preform is used. The curing of molded articles having relatively thick cross sections becomes longer and more difficult in proportion to such cross section. Naturally, heat must be conducted to the entire mass from the mold surfaces before polymerization takes place. In current practice, all of the heat of polymerization must seek the molded part by conduction from the hot mold, so polymerization must naturally take place at different times in different cross sections of the resin. In some molded products which have an extremely large cross section, even on long exposure they fail to completely cure in their center portions. Great difficulty is experienced in this type of operation and long and slow production cycles result from an endeavor to force a sufficient amount of heat through the molded products to make the center portions polymerize.

A principal object of the present invention is to preheat the interior of the preform in a non-uniform manner just prior to placing it in the heated cylinder of a transfer mold or into the mold itself in a compression operation. This non-uniform heat treatment with the greatest heat at the center is a result of dielectric heating and is accomplished by placing the material between two electrodes as in a condenser and applying thereto a radio frequency field of force. Between the electrodes, there is established, therefore, by whatever means is used, a radio frequency field of force which acts upon the dielectric contained between the electrodes.

A common misconception is that the radio frequency field of force established between the heating electrodes is of uniform effect on the dielectric material being heated. The degree of non-uniformity can be controlled within limits so as to create a peaked heating effect at the center, a broader gradient, or an exterior heating effect with a cooler center portion. The effectiveness of the field of force may be controlled by regulation of the dielectric load in relation to the electrodes and also in relation to the frequency of the basic oscillator. For example, heating the preform non-uniformly prior to its insertion in the mold or compression chamber, would bring the center of the preform up to a temperature considerably higher than its exterior portions. When this internally preheated preform is placed in the heated cylinder or mold and pressure is applied, the hot mold surfaces tend further to raise the outside temperature of the preform to approximately the mold temperature; also exothermic and frictional heat reactions further tend to raise the interior temperature of the preform. By balancing the internal uneven effect against the uneven external heating effect, a more uniform heating of the preform is accomplished and results in a more even resin flow and very much faster press closure time. The balancing of the heat energy applied to the preform both through the uneven preheating, and the uneven mold heating, is a principal object of this invention.

A common difficulty in current practice without preheating the preform is experienced from gassing. On occasion, bleeding of the mold, or bumping of the press becomes necessary to relieve these volatiles which are created in the molding compound. When preheated to a sufficiently intense degree, a portion of these volatiles are driven off sufficient to prevent this fundamental difficulty. This pre-elimination of a portion of the volatiles by the preheating of the preform eliminates in the finished product surface gas marks and other difficulties which cause rejects and imperfect pieces of the molded product.

Where the preform is inserted without internal preheat, press closure is long and curing time is dependent upon the number of heat units applied by the mold to the material. Utilizing the non-uniform internal preheating of the preform which is a fundamental part of this invention, in the case of preforms of 30 gram size, press closure has been reduced from thirty seconds to as low as five or ten seconds, while curing time has been reduced from three minutes or more to as little as one minute. This particular example is the case of a transfer molding operation.

In a compression molding operation where an eight ounce preform is used, press closure has been reduced from well over one minute to something less than twenty seconds, while curing time has been reduced from as much as eight minutes to something under two minutes. Preforms of larger size than eight ounces have shown a correspondingly large reduction in both press closing time and curing time simultaneously eliminating the necessity of bleeding the mold or bumping the press to eliminate heat created volatiles. There appears, therefore, a direct saving in time of manufacture and a better quality of product through the use of this non-uniform internal application of heat to the plastic preform. The heating by radio waves can be controlled so that concentrated central heating of the preform can be accomplished or more widespread heating of the interior be effected.

Other objects and advantages will appear in the following specification and the novel features of the device will be particularly pointed out in the appended claim.

The principles of this invention are illustrated in the accompanying drawings forming a part of this application in which:

Figure 1 is a diagram showing internal and surface temperature ranges of the plastic on the first instants of its compression in a mold without internal preheating;

Figure 2 is a diagram showing one example of the relative internal and surface temperatures of the preform as it has been heated unevenly by the radio frequency field of force prior to its insertion in the mold;

Figure 3 shows a diagram combining in a rough measure Figures 1 and 2 with further explanations;

Figure 4 is a rough cross-sectional diagram of a transfer mold showing the relative placement of the preform, the transfer channel, the molds, and the hydraulic pressure piston;

Figure 5:
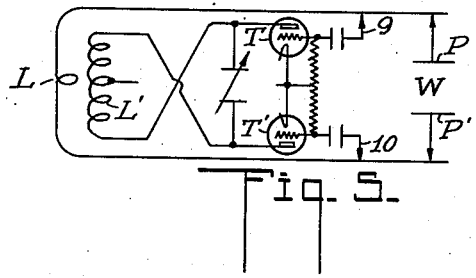
Figure 5 is a wiring diagram of the single standing wave radio circuit shown in our Patent No. 2,506,158, issued May 2, 1950.

While we have shown only the preferred form of our invention, it should be understood that various changes or modifications may be made within the scope of the appended claims without departing from the spirit and scope of the invention. The figures, namely: 1, 2 and 3 show temperature gradients as represented by the lines of the respective charts. These temperature measurements are relative only, and are neither intended to be an exact representative of what happens with a given size preform nor is it intended to illustrate exactly the gradients of heat as between the outside and inside of a preform. The degree of heating internally or externally is dependent upon many factors which are controllable by manual regulation. For example, the temperature gradient in Figure 2 showing the internally preheated preform may as easily be represented by a simple sine curve as is shown in the appended illustration as it may also be represented by a curve drawn as the square of these respective instantaneous values. The spirit and results of the invention are not changed by the degree of gradients shown on the respective charts, but are the same in substance.

When, by uneven internal preheating, through radio frequency wave penetration, we have put into a preform a preheat of sufficient intensity the total number of B. t. u.'s required for polymerization, to be absorbed from the mold itself, is considerably reduced. To set a thermosetting plastic of a given size and at a given temperature, it takes a specific amount of heat. If, through preheating of the plastic preform, we introduce therein three-fourths of the required number of B. t. u.'s for complete polymerization, one-fourth only will have to be added by the heat from the mold itself to complete polymerization. The degree of heat applied to the preform before molding is regulated by several variables which can best be determined on a simple cut and try technique. A desirable limiting factor, however, is putting into the preform a sufficient amount of heat so that on compression exothermic and frictional heat reaction will properly compensate and add to the mass of heat available in the preform for polymerization. In this invention we are utilizing rather than avoiding the exothermic reaction of phenol-formaldehyde resins and we have discovered that such a reaction is a helpful one rather than a hindrance.

Overall advantages of unevenly preheating plastic preforms and molding them in the commonly accepted practice of the industry result in distinct advantages which we might enumerate as follows:

Press closing time either in compression or transfer molding can be reduced in the neighborhood of 75%; curing time can be reduced in proportion to the amount of preheat applied to the preform, a common experience being a reduction of 75%; preelimination of a portion of the volatiles, reduces rejects and prevents the necessity of bleeding the mold or bumping the press; lower pressures are required to accomplish a similar molding operation; larger molded units can be made on the same capacity press; great production increases per unit of press capacity result from a lowering of press closing time, curing time and an increase in capacity.

In Figure 1, we indicate the preform by the squared area C. A center line 3 indicates the center of the preform while the lines 4 and 5 indicate the outer surfaces of the preform. Along the line 4 are temperature markings reading from 0° to 300° F. A curved line 6 shows that the surface temperature of the preform starts at approximately the temperature of the mold, which for illustration is set at 300° F., while the interior temperature of the preform is considerably less. The diagram shown in Figure 1 illustrates the heating of the preform by the hot mold as in compression molding or by the compression chamber in the case of transfer molding.

In Figure 2, we indicate a preform that has been unevenly heated internally by radio frequency wave penetration, utilizing a radio circuit such as the one disclosed in our Patent No. 2,506,158, issued May 2, 1950. The same letters and reference numerals will be applied to Figure 2 as has been applied to Figure 1. In place of the curved line 6, we show a curved line 7 that illustrates the relative interior and surface temperatures of the preform when it has been unevenly heated internally by radio frequency wave energy. The center of the preform C in Figure 2 has been shown at approximately 250° F., while the surface is shown at approximately 150° F. This, as has been stated previously, are only relative indications of temperature.

In Figure 3, we show diagrammatically what happens when exterior heating supplied from the mold is combined with interior heating by radio frequency wave energy. The curved line 6 in Figure 3 illustrates the external uneven heat gradient while the line 7 illustrates the internal uneven heat gradient. The arrows $a$ in Figure 3 show the direction and effect of the exothermic and frictional heat effects of compression while the arrows $b$ show the further effect of surface heat from the molds which tends to move inwardly toward the center of the cross section being molded. The broken horizontal line 8 gives a rough generalization of the average initial heat situation of the plastic when a preheated preform is introduced to the hot mold or pressing chamber in a compression or transfer molding operation. It might be readily seen from this generalization of initial heat effect that the invention herein described has accomplished a very high initial temperature in the entire mass rather than an uneven temperature as is currently experienced in the industry.

The average polymerization of a phenol-formaldehyde resin might take place at between 280° F. and 320° F., so it will be seen that the heated molds need not raise the temperature of the mass to a very great degree before a sufficient heat has been received in the resin to begin the process of complete polymerization. All of the preform or molding powder whether it is associated with a filler or not will in this new method be liquified quickly and completely when it is internally and externally heated in the manner described and the liquified resin material will flow uniformly and quickly into the extremities of the mold cavities and cure more rapidly.

Before describing the operation of the transfer mold in Figure 4, it is best to describe the radio circuit by means of which the interior of the preform is heated in a predetermined manner. The radio circuit shown in Figure 5 is described and claimed in our Patent No. 2,506,158, issued May 2, 1950. The fundamental circuit comprises an inductance L, see Figure 5, and the capacitance W. The plate tank or restorative force circuit is inductively coupled to the fundamental circuit by the center of the inductance L' being inductively coupled to the current antinodal point of the inductance L.

The grids of the tubes T and T' have their taps 9 and 10 adjustably connected to the inductance L at points of great energy reaction. An energy consuming dielectric such as the preform C when placed in the capacitance W will bring the voltage and current into phase and change the position of the crests of the power curves. The grid taps 9 and 10 will be connected to the inductance L at energy crest positions which means the grids will receive proper excitation and bias in connection with the resistance. Because but a single standing wave resides in the circuit, grid and plate swings will increase simultaneously and absorb a greater restorative force, which in turn allows a greater power consumption in the dielectric.

Figure 6:
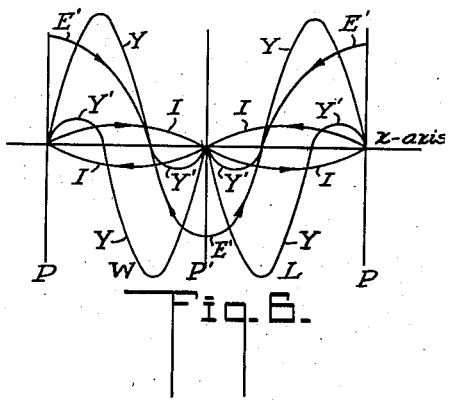
Figure 6 illustrates a power curve when the current and voltage curves are partially in phase.

The power distribution curve Y, shown in Figure 6, illustrates what happens when the current curve I and the voltage curve E' are partially in phase. This is caused by the placing of an energy consuming dielectric in the capacitance or by placing a conductor in the inductance. The small loops Y' are the negative power loops. It will be seen that much more power is consumed in the circuit the first quarter than is returned to the generator in the second quarter of the cycle and also more is consumed in the circuit during the third quarter than is returned to the generator in the fourth quarter of the cycle. The whole cycle is depicted in Figure 6.

The spots of greatest heat in the dielectric may be altered in their positions with respect to each other by: (1) controlling the length of the inductance and the size of the electrodes or plates P and P'; (2) altering the total mass and shape of the dielectric and its dielectric constant; (3) altering the phase angle between the current and voltage which in turn is governed by changing conditions (1) or (2); and (4) employing cauls of differing thickness and dielectric constant. The heating effect on the dielectric is controlled by the phase angle shift and the shift is controlled by the varying of the inductance and capacity and the relative resistance of the load.

Figure 7:
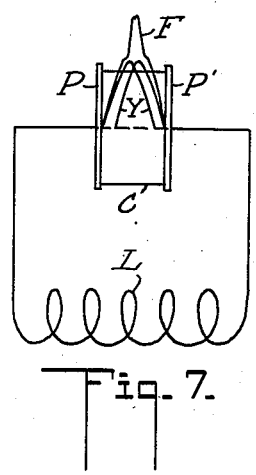
Figure 7 illustrates one type of heating where the power curves overlap to produce a concentrated center heating of the preform.

One example of the internal heating of a preform is illustrated in Figure 7. The peak heating result is shown by bringing the power curves Y that pass through the capacitance portion W of Figure 6, more into an overlapping relation. In Figure 6 the plates P and P' are for the capacitance W shown in Figure 5. The capacitance portion is shown by W in Figure 6, and the inductance portion by L. The thermosetting plastic preform C is illustrated as the load in Figure 7, and this may be placed between cauls, not shown, which in turn space the preform from the electrodes or condenser plates P and P'. The overlapping portions of the power curves Y create the peaked interior heating indicated at F in Figure 7. The high peaked effect indicates that the two hot spots are merged sufficiently to heat the interior of the preform to a greater extent than the individual heat created by each spot.

When the phase angle between the current and voltage approaches 90°, there is very little energy absorption. As the phase angle approaches zero and maximum energy absorption is effective, the two heated areas produced by the power curves Y, merge to form a single area of a higher temperature. Then the heating effect becomes the practical equivalent of E'I or current squared. The two heated internal areas can be adjusted toward and away from each other to adapt the best kind of internal heating for the particular kind of dielectric (preform) being heated.

Figure 4 is a diagrammatic cross section of a typical transfer mold set up. This mold has a recess B for receiving the preform C. A small passage I leads from the recess B to mold cavities indicated generally at D. The entire mold A is openable along the line 2 for freeing the plastic from the molding cavities. It is usual in practice that the entire structure mold A as well as piston E be heated to a temperature of approximately 300° F. and that piston E has a hydraulic action which forces it down into the recess B so that when the preform C is placed in the cavity and pressure is exerted thereon through the hydraulic action of the piston, heat transferred into the plastic from the mold will cause a resin flow in the material through the channel I and into the mold cavities D.

Of course, the outer surface of the preform will be heated first while the inner part of the preform will remain relatively cool. In current practice, the softer outer portions of the preform will be forced by the piston through the passage I around the relatively cooler center portion of the preform, but the complete closing of the piston must await the heating by conduction of the center of the preform which tends to clog the passage to throat I. It will be evident when looking at Figure 4 in conjunction with the internal heating action which takes place in Figure 3 and caused by radio frequency heating as set forth in Figures 5, 6 and 7, that upon compression of the piston E in Figure 4, an even resin flow will result and a faster press closure be evidenced as a result. While Figure 4 illustrates a typical transfer molding set up, a compression molding operation performs in the same manner, except as to the flow of material through the passage I to the mold recesses. In the case of compression molding, the flow of the cooler center of the preform awaits complete absorption of heat from the outside as does the cooler center of the preform in transfer molding. The results, therefore, are similar.

In an earlier part of the specification we refer to the use of a radio circuit disclosed in our Patent No. 2,506,158, for generating radio frequency waves that will unevenly heat the interior of a preform with the greatest heat being generated at the center. This uneven internal heating of a dielectric by radio frequency waves is disclosed in our copending application on a Process of Controlling and Placing of Radio Frequency Heat in a Dielectric, Serial No. 750,836, filed May 27, 1947, now Patent No. 2,599,850. In this copending case we disclose two spot heating in a dielectric and illustrate how the positions of the heating spots may be shifted. Figures 5, 6 and 7 are copied from Figures 1, 5 and 9 of application Serial No. 750,836.

The two spot heating in a dielectric results from the use of a single standing wave in a radio circuit. Another of our patents, No. 2,506,158, issued May 2, 1950, is directed to the forming of standing waves in a radio frequency circuit. It is possible to maintain only a one-half standing wave in the capacitance of a radio circuit and place a dielectric such as a preform in the capacitance so that the one-half standing wave will unevenly heat the interior of the preform. The interior of the preform will be heated greatest at two spots and adjustment in the radio circuit can be made to bring these spots close together to practically merge them or to space them one from the other. We wish to make the disclosure in both these last mentioned copending applications and patents, a part of the present disclosure.

Figure 8:
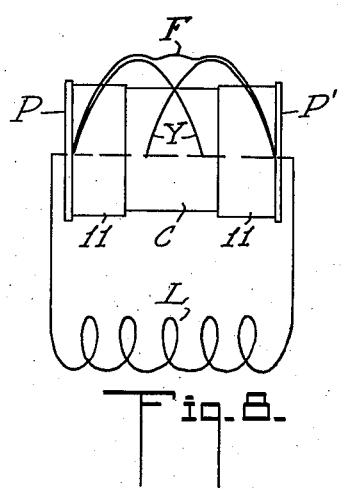
Figure 8 illustrates another type of radio frequency internal heating where the power curves overlap to a less extent to produce a broader interior heating of the preform.

In Figure 8 we show how a broader internal heating of the preform is effected by radio frequency waves. The inductance L may be variable or the plates P and P' of the condenser may be varied in size to bring the power curves Y into a more out-of-phase relation than shown in Figure 7. Cauls II are placed between the preform C and the plates P, P' if desired. The heat curve F in Figure 8 is not so peaked as it is in Figure 7.

It will be seen from this that the two hot spots in the preform can be moved toward or away from each other to internally heat different kinds of preforms in the desired manner. Furthermore, it is possible to heat the preform internally when in the mold by radio frequency waves rather than heat the preform internally as an initial step and then place it in the heated mold for the molding operation.

Summary

It is common knowledge that each half cycle of an alternating current contains two power peaks, one positive and one negative provided the current leads or lags the voltage.

In a traveling wave of alternating current, these peaks travel with the wave which, of course, would produce uniform heating in a conductor because of the average effects as the peaks pass successively any given point.

If such a wave, however, is reflected back upon itself, a so called standing wave results. Hence if the wave pattern "stands," so to speak, then so also must the power peaks "stand" with relation to the dielectric or conductor involved. The maximum point in any one of the power peaks indicates a point in the standing half wave where potential energy is being converted to kinetic energy at the greatest rate. The reverse can also be stated, i. e. "kinetic energy is being converted to potential at the greatest rate." Thus electric energy is converted to heat energy at the greatest rate in the dielectric or conductor situated at these maximum points. Substances repeatedly subjected to this maximum of energy conversion will result in "two spot" heating in a half wave field of force and as a single spot in a quarter wave field.

A standing wave pattern consists of nodes and antinodes of potential and kinetic energy states.

Capacitor plates, constituting a half standing wave system between which a dielectric substance may be heated, are the boundaries where the oscillating electrons "sit" and "depart from" and are the regions where potential energy is stored.

Since, in these regions, electrons approach rest they can accomplish little or no work, hence little heat is developed adjacent the surface of the plates.

On the other hand, electrons situated near the plane located parallel and half way between, are displaced with a maximum of amplitude and since, they at their mid swing, are neither accelerated nor decelerated, again can do no work. Consequently a minimum of heat is developed in the dielectric at this mid position.

Again we see that the heat placement in the dielectric is certainly non uniform for the above reasons taken alone. Whether these peaks spread apart or merge together, other things remaining the same, depends upon the power or power factors of the substance or substances constituting the character of the dielectric.

Considerable control may be exercised with respect to heat placement by properly positioning the dielectric mass with respect to the centers of potential energy maximums and the kinetic energy maximum (1) by means of cauls, (2) by shaping the electrodes to produce fringing or concentration of electric field, (3) or by governing the power factor of a mixture by introducing other ingredients, commonly moisture content.

We claim:

The process of preheating a preform composed of thermal-setting resins comprising subjecting the preform to radio frequency wave energy directed to two spaced points at the proximate center of the preform to establish a non-uniform gradient of heat radiating from said center of the preform outwardly and subsequently heating the preform exteriorly to render said gradient substantially uniform throughout the preform at a moldable temperature.

JULIUS W. MANN.
GEORGE F. RUSSELL.

References Cited in the file of this patent

UNITED STATES PATENTS

| Number | Name | Date |
|--------|------|------|
| 2,339,607 | Smith | Jan. 18, 1944 |